June 24, 1930.   J. T. COGHILL   1,767,743
BELT CONVEYER ROLL WITH LUBRICATION SYSTEM
Filed Dec. 29, 1924
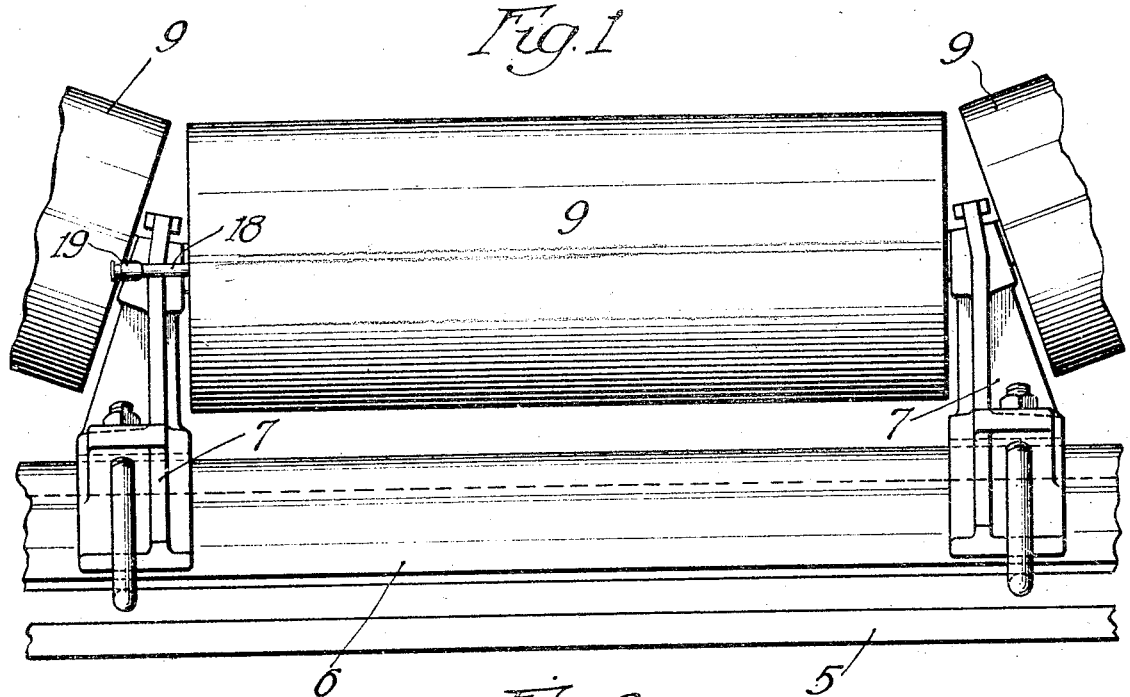
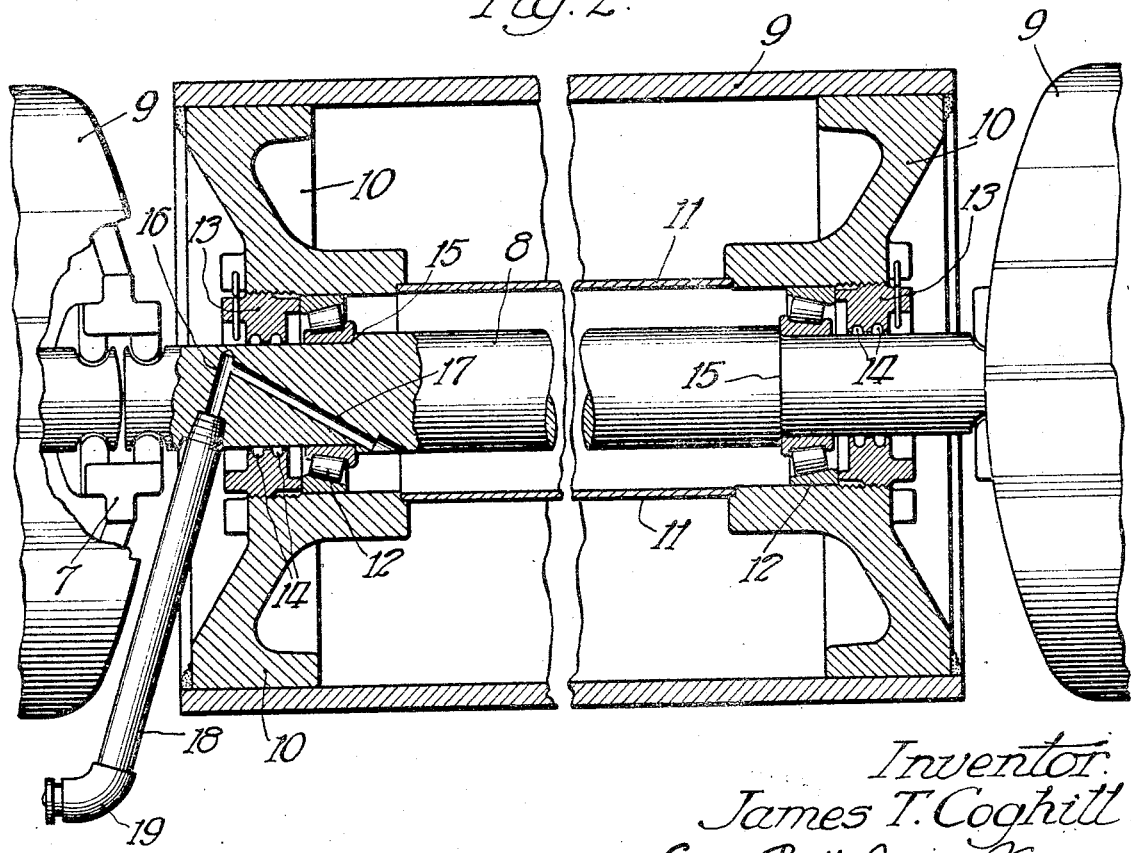
Inventor:
James T. Coghill.
Emery, Booth, Janney & Varney
Attys.

Patented June 24, 1930

1,767,743

UNITED STATES PATENT OFFICE

JAMES T. COGHILL, OF MISHAWAKA, INDIANA, ASSIGNOR TO DODGE MANUFACTURING CORPORATION, A CORPORATION OF DELAWARE

BELT-CONVEYER ROLL WITH LUBRICATION SYSTEM

Application filed December 29, 1924. Serial No. 758,508.

This invention relates to belt conveyer rolls with lubrication systems, and among other objects aims to provide an improved construction and arrangement whereby the rolls of a conveyer unit, though individually removably mounted in sufficiently close juxtaposition to prevent sagging of the belt between adjacent roller ends, may be easily and effectively lubricated either when in operative position or when removed from the conveyer.

The invention may be understood by reference to one illustrative embodiment shown in the accompanying drawings, in which:

Fig. 1 is an elevation of part of a belt conveyer unit or so-called troughing support embodying the invention; and Fig. 2 is an enlarged sectional plan view of the same.

The lubrication of belt conveyer rolls or idlers has always been attended with difficulties. Because of the relative inaccessibility of such rolls, their lubrication is apt to be neglected until the bearings run dry and destructive wear of the belt, as well as of the rim of the roll, has resulted. According to the invention, the rolls, which turn on axles, have each an interior reservoir for lubricant, which is supplied through a conduit individual to the roll and leading from a readily accessible point outside the roll through said axle. The construction and arrangement of the rolls and their lubricating equipment and roll supports are such that while the roll ends may be quite close together, each roll, with its independent lubricating system, is quickly and easily removable without disturbing the others.

It is to be understood that the illustrative form shown in the drawings is simply a preferred embodiment of the invention; and that in the following explanation of that specific form, the described details of structure and organization are merely exemplary.

The part of the belt conveyer unit which is shown comprises a decking 5, a transversely extending angle bar 6 secured at its ends to the decking, and supporting standards or brackets 7 secured to the angle bar 6 and having seats at their upper ends for the shafts or axles 8 of the relatively inclined conveyer rolls. As seen at the left hand side of Fig. 2, the ends of the axles and their seats are so shaped as to interlock with each other, thereby preventing any movement of the axles while the rolls are in service. The seats, however, open upwardly to permit removal of each roll by merely lifting it.

Each roll of the conveyer unit includes an outer cylindrical shell 9, end members 10 fitted within and closing the ends of the shell, a tube 11 interposed between and sealed by the end members, bearings 12, herein tapered roller bearings, and bearing-adjusting nuts 13 screw-threaded within the end members. The tube 11 provides a lubricant reservoir open to the bearings but sealed by the nuts 13, shown as having coaxial grooves 14 surrounding the axle to collect grease and thereby form grease seals. To hold the bearings spaced apart, the axle may have annular shoulders 15. The bearings are properly positioned in relation to the roll and axle by the said shoulders 15 engaging the bearing cone rings and the nuts 13 bearing against the cup rings.

To permit pressure feed of lubricant, such as grease, into the bearings, the axle is bored to provide a continuous conduit leading from the outside of the roll, past the grease seal and into the lubricant chamber; and a grease introducing pipe extends outwardly from the outer end of said bore and has means permitting the attachment thereto of a force feed filler. As shown, the axle is bored as at 16 and 17, said bores extending at an acute angle to each other and forming a by-pass, as it were, around the grease seal and bearing. At the outer end of bore 16, i. e., between the supported end of the axle and the end of the roll, a pipe 18 is screwed into the axle, and extends outwardly therefrom at an acute angle. When the roll end members are dished, as shown, ample space is provided for the pipe 18, while at the same time the ends of the rolls may almost touch, though without interference when it is desired to remove one of them. On the end of pipe 18, which extends to one side of the rolls, is a grease gun nipple 19. Though the illustrated arrangement of the bores is not mandatory, it is preferred, especially as the two bores are quite short and therefore are easy to drill. It will be noted that the lubricating system of each roll forms a part of a unitary construction, and that the individual rolls can be lifted out from their respective supporting standards by movement at right angles to their respective axes, there being clearance between the roll extremities and the standards so that no tilting or canting of the rolls is necessary to disengage them from the standards.

Obviously the present invention is not restricted to the particular embodiment thereof herein shown and described. Moreover, it is not indispensable that all the features of the invention be used conjointly since they may be employed advantageously in various combinations and subcombinations as defined in the claims.

What is claimed is:—

1. In combination a roll, an axle having a short projecting end for detachable engagement with a support, a bearing located inwardly of said axle end and mounted between said axle and said roll, means in the roll encasing said bearing, lubricant supply means located between said axle end and said bearing, and a duct in said axle leading therefrom to the interior of said bearing encasing means at the opposite side of the bearing.

2. In combination a roll having a concave end, an axle having a short projecting end, for detachable engagement with a support, a bearing located inwardly of said axle end and mounted between said axle and said roll, means in the roll encasing said bearing, lubricant supply means located between said axle end and said bearing in the concavity of said roll end, and a duct in said axle leading therefrom to the interior of said bearing encasing means at the opposite side of said bearing.

3. In combination, a roll, an axle having a short projecting end for detachable engagement with a support, a bearing located inwardly of said axle end and mounted between said axle and said roll, means in the roll encasing said bearing, a lubricant tube attached to said axle between said axle end and bearing and projecting outwardly therefrom closely adjacent to the end of the roll, and a duct in said axle leading from said tube to the interior of said bearing encasing means at the opposite side of the bearing.

4. In combination, a pair of rolls arranged end to end and having their axes relatively inclined, a support mounted between said rolls, an axle for each of said rolls, each of said axles having a short projecting end detachably engaging said support, a bearing mounted on each of said axles spaced from the support-engaging end thereof and located between said axle and said roll, a lubricant tube located between said rolls and connected to one of said axles between said support and said bearing on said axle, and a duct in the axle leading therefrom to convey lubricant to said bearing.

5. In combination, a pair of rolls arranged end to end and having their axes relatively inclined, at least one of the adjacent roll ends being recessed, supporting means mounted between said rolls, an axle for each of said rolls having a short projecting end detachably engaging said supporting means, lubricant supply means in the said recessed roll end between the supporting means and one of said bearings, and a duct leading therefrom to convey lubricant to said bearing.

6. A conveyer roll embodying a head with a dished or recessed outer face and constructed to provide a bearing case set inwardly from the end of the roll, an axle having a support-engageable end proximate to the end of the roll, a bearing unit mounted on the axle within said case, the bearing case providing a receptacle for grease on the inner side of the bearing, a grease introducing tube connected laterally to the axle on the outside of the bearing between it and the axle end, and a duct in the axle for delivery of grease from said introducing means to the receptacle in the case on the inner side of the bearing.

7. In a structure of the class described comprising conveyer rolls arranged end to end on relatively inclined axes, a conveyer roll having recessed ends and inwardly set bearings and an axle terminating near the roll extremities, said axle provided at each end with means for detachable engagement close to but outside the roll ends with supporting standards, and having a grease introducing tube attached to the axle laterally thereof between one of the axle extremities and the adjacent roll bearing, there being provision including a conduit in the axle for conducting the introduced grease to the inner sides of the bearings, and the said introducing tube projecting clear of the space required for such standard and clear of the said roll and next roll and only a sufficient distance to present the receiving end of the tube at a conveniently accessible point away from the roll ends.

8. A structure of the class described having, in combination, idler rolls arranged end to end on relatively inclined axes, said rolls having axles projecting only slightly beyond the roll extremities and having inwardly set bearings on said axles; standards between which the rolls are arranged and from which they are removably supported through their axles, including intermediate standards from which adjacent axle ends are supported in proximity to each other; and means for supplying lubricant to the bearings of an intermediate roll, including a grease introducing tube attached to the roll axle laterally thereof between one of the axle extremities and the adjacent roll bearing, and a conduit in the axle through which said tube communicates with grease spaces at the inner sides of the bearings, said tube projecting between adjacent roll ends clear of the interposed standard to a conveniently accessible point.

9. A structure of the class described having, in combination, conveyer rolls arranged closely adjacent end to end, including an intermediate roll and lateral rolls inclined to the intermediate roll; the respective rolls having axles and antifriction bearings to sustain radial load and end thrust mounted on said axles and on which the rolls revolve, the said bearings being set inwardly from the roll ends and the axle ends projecting outside said bearings; supports in which the axle ends are detachably seated, including intermediate supports arranged in the gaps between adjacent rolls and having closely adjacent seats for adjacent axle ends; the rolls being individually removable by lifting them from their respective supports; the axles having ducts and the rolls having reservoirs in communication therewith through which grease supplied through the ducts enters the bearings on their inner sides; there being grease seals at the outer sides of the bearings; and grease introducing tubes laterally connected with the roll axles at points adjacent but outside of roll bearings and communicating with the ducts of said axles, including a grease introducing pipe connected to the intermediate roll axle and projecting laterally between adjacent rolls to a readily accessible point; whereby the bearings may be maintained efficiently lubricated and grease may be supplied to the bearings of the individual rolls while the rolls are running and without necessitating removal of any individual roll, and the rolls are individually removable with their respective lubricating systems.

10. A structure of the class described comprising, in combination, conveyer rolls arranged closely adjacent end to end with their axes relatively inclined one to another; the respective rolls having axles and antifriction bearings to sustain radial load and end thrust mounted on said axles and on which the rolls revolve, the said bearings being set inwardly from the roll ends and the axle ends projecting outside said bearings; supports in which the axle ends are detachably seated, including intermediate supports arranged in the gaps between adjacent rolls and having closely adjacent seats for adjacent axle ends; said axles having conduits for delivering grease to the roll bearings, each conduit having a lateral inlet between a supported axle end and the adjacent bearing; and grease introducing tubes connected to said axles at said inlets and projecting laterally therefrom beside the adjacent roll ends; whereby the several rolls have each a lubricating system unitary and removable therewith, which individual systems may be supplied with grease while the rolls are in place as well as while they are removed.

11. A structure of the class described comprising, in combination, a series of conveyer rolls arranged end to end; said rolls containing antifriction bearings on which they revolve and axles on which said bearings are mounted; the bearings being set inwardly from the roll ends and the axle ends projecting outside said bearings; means supporting adjacent axle ends to hold the rolls with their adjacent ends close to one another and to allow removal of individual rolls; said axles having conduits for delivering grease to the roll bearings, each conduit having a lateral inlet between a supported axle end and the adjacent bearing; and grease introducing tubes connected to said axles at said inlets and projecting laterally therefrom beside the adjacent roll ends; whereby the several rolls of the series have each a lubricating system unitary and removable therewith, which individual systems may be supplied with grease while the rolls are in place as well as while they are removed.

12. A structure of the class described having, in combination, conveyer rolls arranged end to end and relatively inclined one to another and closely spaced to provide narrow gaps between adjacent roll ends at the tops thereof; the respective rolls having axles and antifriction bearings to sustain radial load and end thrust mounted on said axles and on which the rolls revolve, the bearings being set inwardly from the ends of the rolls and the axle ends being outside the bearings; means between adjacent rolls supporting adjacent axle ends in close proximity to hold said rolls closely adjacent; and means for introducing lubricant to an intermediately situated roll bearing comprising a grease introducing pipe connected with a roll axle between its supported end and said bearing and projecting laterally between adjacent roll ends, and a conduit in said axle communicating with said pipe and arranged to deliver the grease at the inside of the bearing.

13. A structure of the class described having, in combination, conveyer rolls arranged closely adjacent end to end, including an intermediate roll to which other such rolls are relatively inclined; the respective rolls having axles and antifriction bearings to sustain radial load and end thrust mounted on said axles, on which bearings the rolls revolve; the said bearings being set inwardly from the roll ends and the axle ends being outside said bearings; means supporting the axle ends so as to hold the rolls with their adjacent ends close to one another; said axles having grease conduits and said rolls having reservoirs into which said conduits discharge and through which the grease enters the roll bearings on the inner sides of the bearings; there being grease seals on the outer sides of the bearings; and grease introducing means at roll ends connected with the roll axles at points between the ends of the roll and the adjacent roll bearings for introducing grease to said conduits, including a grease introducing pipe connected with said intermediate roll axle and projecting laterally between adjacent roll ends to a readily accessible point; whereby the bearings may be maintained efficiently lubricated and grease may be supplied to the bearings of the individual rolls while they are in position and in operation.

14. A structure of the class described having, in combination, conveyer rolls arranged end to end with their axes relatively inclined one to another; the respective rolls having axles and tapered roller bearings mounted on said axles and on which the rolls revolve; said rolls embodying bearing cases set inwardly from the ends of the rolls and in which said bearings are mounted, said cases providing grease receptacles on the the inner sides of the bearings and having bearing adjusting rings and grease seals on the outer sides of the bearings; the axles extending through said bearing cases and supported at their ends in proximity to the ends of the rolls; grease introducing tubes for the respective rolls each connected with a roll axle outside a bearing case, including a tube projecting laterally between adjacent roll ends to an accessible point, and ducts in said axles in communication with said tubes for delivering grease to the grease receptacles at the inner sides of the bearing.

15. In a structure of the class described the combination with conveyer rolls arranged closely adjacent end to end on relatively inclined axes, said rolls having axles and antifriction bearings thereon set inwardly from the roll ends, of supporting standards from which the rolls are removably supported by their axle ends, there being clearance between the roll ends and adjacent faces of the standards so that each roll can be lifted by movement at right angles to its axis until its bottom is clear of its supporting standards, and means for lubricating the rolls comprising grease introducing tubes connected to the roll axles each outside a bearing between it and the adjacent supporting standard and ducts in the axles communicating with said tubes and arranged to deliver the grease at the inside of the bearings.

In testimony whereof, I have signed my name to this specification.

JAMES T. COGHILL.